Sept. 6, 1938.  D. O. SPROULE  2,129,155
VISUAL INDICATOR FOR ECHO SOUNDING APPARATUS
Filed March 27, 1936  2 Sheets-Sheet 1
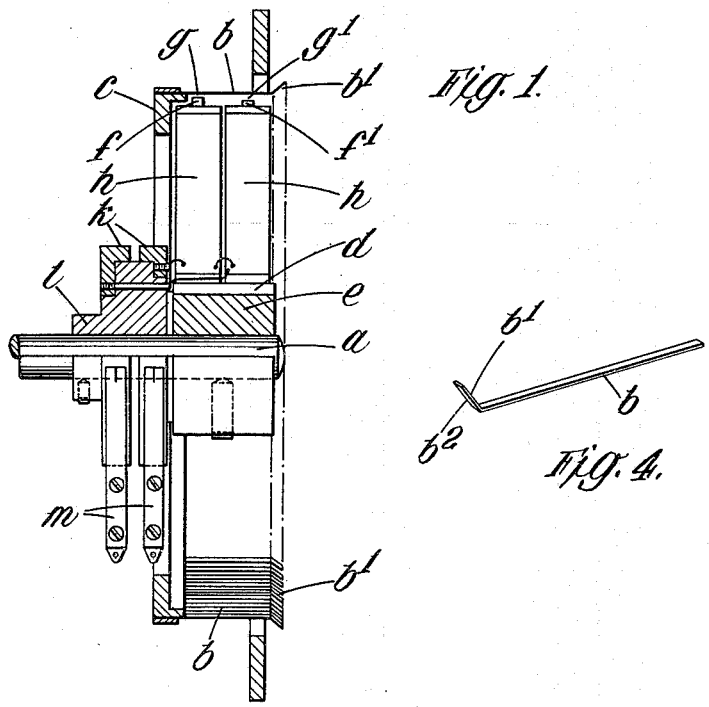
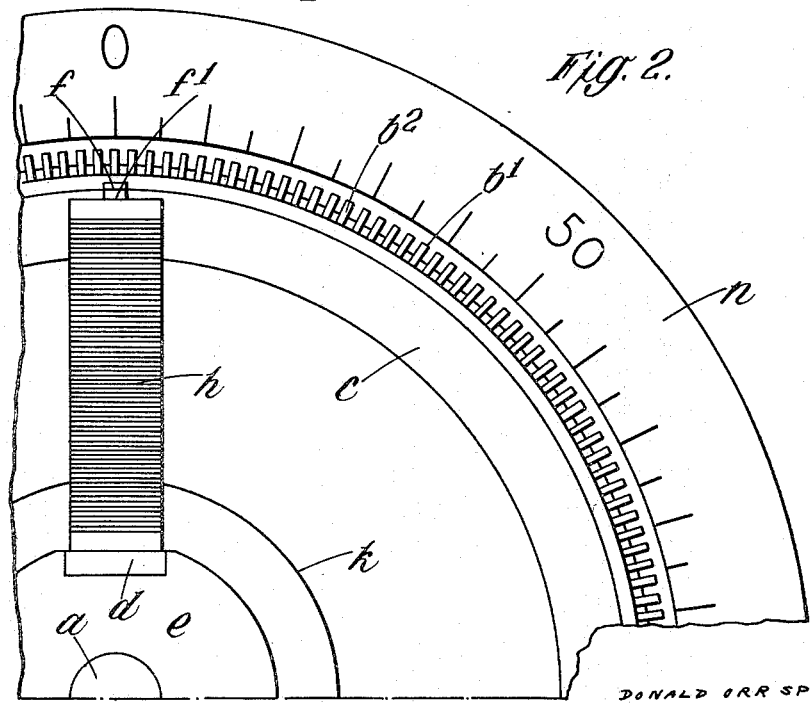

Sept. 6, 1938.         D. O. SPROULE         2,129,155
VISUAL INDICATOR FOR ECHO SOUNDING APPARATUS
Filed March 27, 1936         2 Sheets-Sheet 2

Patented Sept. 6, 1938

2,129,155

UNITED STATES PATENT OFFICE 2,129,155

VISUAL INDICATOR FOR ECHO SOUNDING APPARATUS

Donald Orr Sproule, London, England, assignor of one-half to Henry Hughes & Son Limited, London, England Application March 27, 1936, Serial No. 71,339
In Great Britain April 2, 1935

5 Claims. (Cl. 177—386)

This invention relates to improvements in visual indicators for echo sounding apparatus of that kind in which the depth or distance is deduced from the small time intervals between the emission of a signal and the reception of its echo and has for its principal object to provide means whereby excitation of the echo receiver is rendered apparent to the eye in a more effective manner than has been possible in the past.

The production of a direct reading visual indicator for echo sounding apparatus has received considerable attention in the past and it has been suggested to reveal an arm or mirror, rotating at a uniform velocity in time relation to the emission of signals, momentarily by flashes of light on the excitation of the echo receiving apparatus so as to enable the echo time to be ascertained as an angle and the depth deduced therefrom, but as in such an arrangement it is essential that each flash of light shall exist only for a very short period of time and as all the flashes are of equal intensity, difficulties in observation arise inasmuch as it is not possible to distinguish those indications due to the reception of an echo pulse easily from the indications of spurious noise pulses not being echoes of signals.

One object of the present invention is to provide means by which it is possible to obtain a visual indication of such a character that although spurious indications are present the indication of the depth or distance, owing to its persistence and form, can be distinguished from such spurious indications by the eye with less difficulty than with known arrangements.

Another object of the invention is to provide visual means for indicating the emission of a signal as well as the reception of its echo thus enabling the location of the indication of emission relatively to the zero of the scale to be ascertained as well as the continued operation of the installation in the absence of an echo to be checked more easily and conveniently than is possible with known indicators.

Another object of the invention is to provide visual indicating means adapted to enable distances from a reflecting surface of any kind through any media to be ascertained with great accuracy by echo sounding apparatus in a very convenient manner, by reliable mechanism and with the expenditure of only a very small amount of electrical energy.

The invention consists in an improved visual indicator for echo sounding apparatus comprising a plurality of displaceable elements arranged as a series in relation to a scale; a member displaced relatively to said elements in timed relation to the emission of signal pulses; and an electrical device mounted on said member so that a part of said device follows a path close to said elements, said device being adapted when excited by an electrical pulse to displace that element which is or those elements which are in proximity to said device at the moment of excitation.

In the drawings:

Figure 1 is a part sectional elevation of one form of visual indicator according to this invention;

Figure 2 is a fragmentary front elevation of Figure 1 drawn to a larger scale;

Figure 4 shows a detail.

Figure 3:
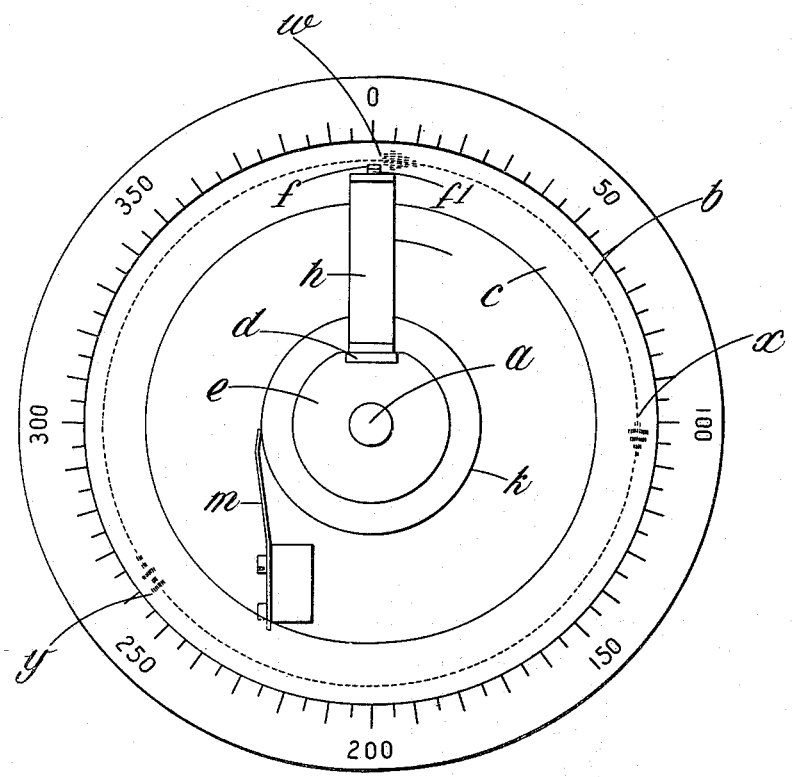
Figure 3 is a front elevation of the instrument shown in Figure 1 showing diagrammatically the appearance of different indications which persist long enough to be recognized.

The visual indicator shown in the drawing comprises a spindle $a$ rotated at a uniform angular velocity and in timed relation with the signal sound pulse transmitter; a plurality (say about two hundred in a small indicator) of uniformly spaced reeds $b$ made of iron or other magnetic metal, said reeds $b$ being all of the same size and shape and being mounted on a stationary frame $c$ as elastic cantilevers with the longitudinal axes thereof substantially parallel to one another and substantially parallel to the axis of rotation of the spindle $a$; and an electro magnet having a yoke $d$ attached to a hub $e$ mounted on the spindle $a$ so that the limbs $f$ $f^1$ of said electro magnet project at right angles to the axis of rotation.

The limbs $f$ $f^1$ of the electro magnet have terminal faces the dimension of which, in the direction of movement of said limbs, is comparable with the width of two reeds $b$ and the space between them, whilst the length of the limbs $f$ $f^1$ is such that the terminal face of the limb $f$ moves in close proximity with the bases, or points of anchorage on the frame $c$ of the reeds $b$ and the terminal face of the limb $f^1$ moves at a small distance measured radially, from the unsupported ends so that as the spindle $a$ is rotated a magnetic circuit including a small air gap $g$ and a larger air gap $g^1$ is completed through each reed $b$ in turn, and each reed $b$ can be displaced by magnetic attraction without coming into contact with the end of the limb $f^1$.

To enable the electromagnet to be excited by the electrical pulses in the output circuit of the receiver incidental to the reception of an echo or other sound pulse, each of the limbs $f$ $f^1$ is provided with a coil $h$ connected electrically to slip rings $k$ $k$ carried on a bush $l$ of insulating material mounted on the spindle $a$, said rings $k$ $k$ cooperating with brushes $m$ $m$ connected electrically to the output circuit of said receiver through such stages of amplification as may be necessary.

The free end of each of the reeds $b$ is bent outwards at $b^1$ (as shown in Figure 4) and the face $b^2$ is silvered or otherwise marked or coated so as to enable any displacement and vibration of the reed to be observed by normal eyes easily and unaided.

As stated above in the example being described the spindle $a$ is rotated at a uniform speed and the reeds $b$ are spaced uniformly so the angular distance between adjacent reeds (from the centre of one reed to the centre of the next) represents a definite time interval and consequently a definite depth or distance of sound travel (four hundred fathoms depth of water being regarded as the equivalent of one second of time) and as the spindle $a$ is rotated in timed relation with the emission of signal pulses from the transmitter if an evenly divided scale $n$ is associated with the reeds $b$ and the zero of the scale $n$ is disposed at the transmitting point, the scale $n$ can be calibrated in fathoms or feet or seconds as desired.

In operation, as the spindle $a$ is rotated the electromagnet is excited by the passage of electrical pulses from the output circuit of the receiver through the coils $h$ $h$ each time a sound pulse is received and the reeds $b$ through which magnetic circuits are completed, will be displaced, released and continue to move for a short period of time, thus enabling the angular position of the limbs $f$ $f^1$ of the electromagnet at the moment of time when a sound pulse arrives to be seen clearly, not only at the moment of arrival of the pulse but also thereafter for a short period of time the duration of which depends on the natural period of vibration of the reed $b$ and the damping present.

It will be clear that, although satisfactory operation can be obtained with series of similar reeds of all kinds within the limits of dimension, by selecting or tuning the reeds $b$ so that the periodic time of natural vibration thereof has a definite relation to the invariable time interval between the sound pulses transmitted, the displacement of those reeds $b$ which are influenced magnetically each time the limbs $f$ $f^1$ pass (zero and depth reading) will be augmented to a maximum extent and can be distinguished more easily from the occasional displacement of reeds $b$ by spurious pulses due to interfering noises. This ease of distinction is due to the steady persistence of the indications of signal pulses emitted and of echo pulses received so that the eye is not confused by the random momentary trifling and unrepeated indications of spurious noise pulses as happens with instruments employing flashes of light which render every noise pulse (signal echo or spurious) as an indication of equal value.

From the above it will be seen that the response of a reed $b$ has or can be made to have a definite relation to the intensity of the sound pulse causing it and accordingly the eye will be informed of the form of a signal or of an echo pulse by the disturbance of the reeds $b$ at the point of indication. This is shown diagrammatically in Figure 3 in which the indication marked $w$ represents the disturbance of the reeds $b$ which occurs continuously, whilst the installation is functioning, at that moment of time when the signal pulse is transmitted, its form being similar to that of the echo indication. The indication marked $x$ represents the disturbance of the reeds $b$ which occurs as a result of repeatedly received echo pulses, at such angular distance from zero as represents the depth at which the signal pulse is reflected, its form being distinguished from other indications by its smooth contour, rising sharply to a peak and then falling away more slowly than it rises.

The echo indication is to be further distinguished from other indications by occurring at or near the same point on succeeding cycles or transmission of sound.

The indication marked $y$ represents an example of a random disturbance due to ships' noise, water noise, electrical interference etc., it being distinguished from other indications by the irregularity of its form, and in general by its non-recurrence at or near to the same position of the scale for succeeding cycles of transmission of sound.

Inasmuch as the amount of electrical energy required to energize such an indicator is so small it is particularly well suited for association with known recording instruments thus enabling a permanent record to be made of visual indications observed at a distance.

The individual parts of the indicator shown in the drawings and described above and their arrangement relatively to one another may be modified considerably without exceeding the ambit of the invention; for instance, the reeds $b$ may be regarded as a specific form of element which in general may be in the form of elastic cantilevers arranged with their axes disposed parallelly or angularly to one another as a series in a plane or curved surface of any defined configuration and may be formed of metal or other material or combination of metals and/or other materials some or all of which are responsive to an electromagnetic or an electrostatic field or be suitable for mechanical actuation; alternatively each of the elements may be pivoted or. hinged at one end or intermediately of its ends and be provided with such spring means as may be necessary to maintain the integrity of operations as an indicator, the individual elements being tuned and/or damped as may be requisite to enable them to give an indication of the desired amplitude for the requisite period of time.

Further the hub $e$ may be regarded as a specific form of member which in general may be displaced relatively to the elements by the signal pulse transmitter at a specified rate obviously it may be rotated about an axis at a uniform speed or at a speed varying in accordance with a defined law, or it may be oscillated about an axis or it may be moved to and fro along a defined path depending on the configuration and arrangement of the series of elements cooperating therewith and the spacing of said elements and upon the nature of the scale required.

Further the electromagnet may be regarded as a specific form of device which in general may be made responsive to the electrical pulses from a sound receiver, clearly it may be electromagnetic or electrostatic in character, may be adapted directly to affect the elements when excited or it may be an electromechanical device adapted when excited electrically to cooperate with the elements mechanically.

It is to be understood clearly that the reference to "echo sounding apparatus" in this specification is intended to include installations for the reception of reply signals as well as installations for the reception of reflected signals provided that such installations function by the measurement of a time interval.

Also it will be obvious that by associating recording mechanism of suitable kind with the moving parts of the improved indicator through the intermediation of appropriate gearing a combined indicating and recording mechanism can be produced without difficulty.

I claim:

1. In a visual indicator having a scale, a series of vibratable similar elements arranged in uniformly spaced relation along the scale, a member, means for continuously moving said member along said scale at a uniform speed and electrical means mounted on said member and positioned to move close to said elements and to vibrate the elements which are in proximity thereto at the instant of excitation of said electrical means by an electrical pulse to give a temporarily persistent visual indication.

2. In a visual indicator having a scale, a series of elastic cantilevers arranged in uniformly spaced relation along the scale, a member, means for continuously moving said member along said scale at a uniform speed and electrical means mounted on said member and positioned to move close to said cantilevers and to vibrate the cantilevers which are in proximity thereto at the instant of excitation of said electrical means by an electrical pulse to give a temporarily persistent visual indication.

3. In a visual indicator having a scale, a series of vibratable similarly tuned reeds arranged in uniformly spaced relation along the scale, a member, means for continuously moving said member along said scale at a uniform speed and electrical means mounted on said member and positioned to move close to said reeds and to vibrate the reeds which are in proximity thereto at the instant of excitation of said electrical means by an electrical pulse to give a temporarily persistent visual indication.

4. In a visual indicator having a scale, a series of vibratable similarly tuned magnetic reeds arranged in uniformly spaced relation along the scale, a member, means for continuously moving said member along said scale at a uniform speed and an electromagnet mounted on said member and positioned to move close to said reeds and to vibrate the reeds which are in proximity thereto at the instant of excitation of said electromagnet by an electrical pulse to give a temporarily persistent visual indication.

5. In a visual indicator having a scale, a series of vibratable similar reed like magnetic elements arranged on the surface of a solid of revolution in uniformly spaced relation along the scale, a member, means for continuously moving said member along said scale at a uniform speed and an electromagnet mounted on said member and positioned to move close to said elements and to vibrate the elements which are in proximity thereto at the instant of excitation of said electromagnet by an electrical pulse to induce temporarily persistent movement of said elements and a visual indicator on each element to enable the temporarily persistent movement to be observed.

D. O. SPROULE.